Aug. 10, 1965  G. R. ROBSON  3,199,416
FLUID PRESSURE ACTUATORS FOR PRODUCING ROTARY MOTION
Filed April 6, 1964  3 Sheets-Sheet 1

INVENTOR
Gordon Raymond Robson
BY Winter & Tockman
ATTORNEYS

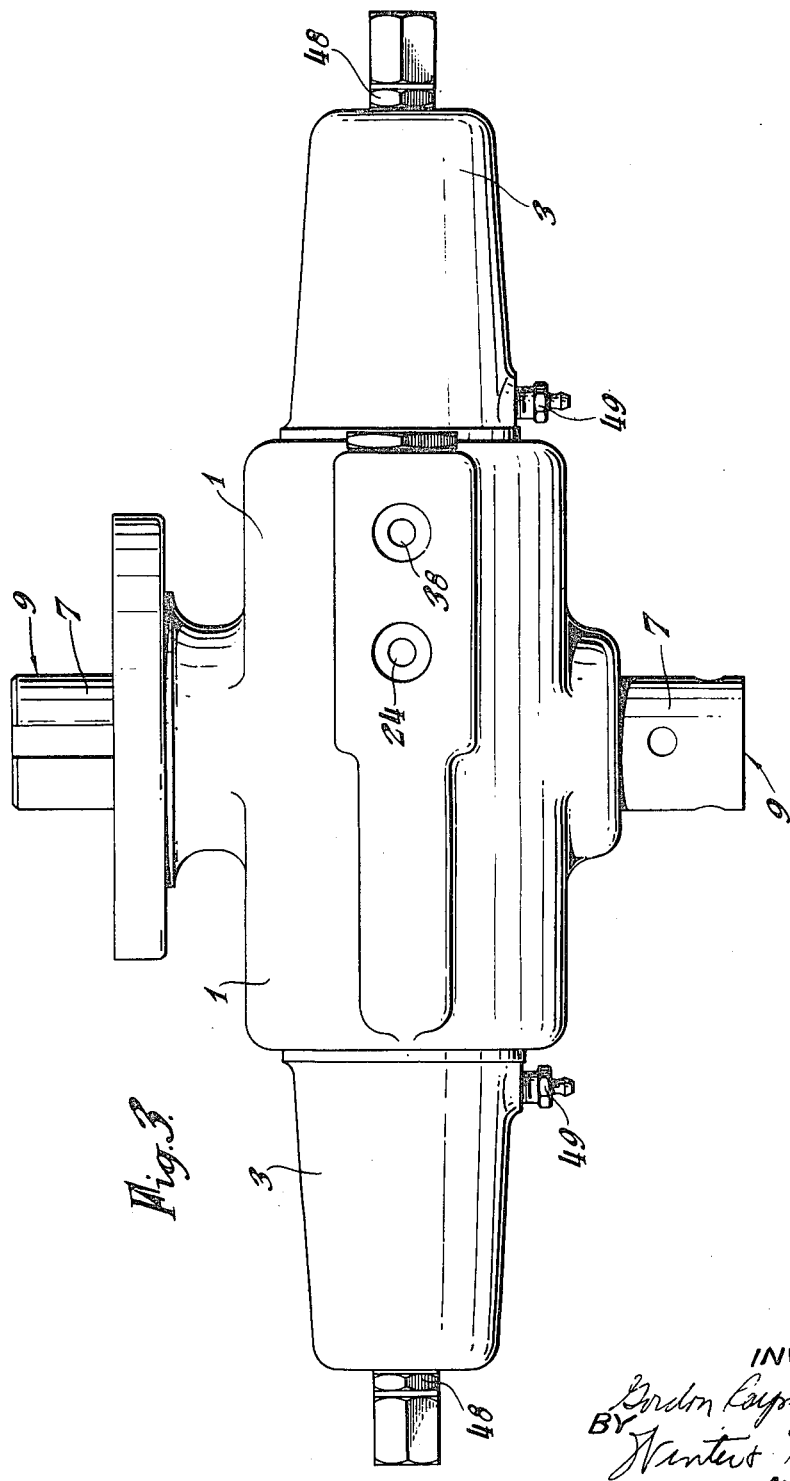

United States Patent Office 3,199,416
Patented Aug. 10, 1965

3,199,416
FLUID PRESSURE ACTUATORS FOR
PRODUCING ROTARY MOTION
Gordon Raymond Robson, Leamington Spa, England,
assignor to Automotive Products Company Limited,
Leamington Spa, England
Filed Apr. 6, 1964, Ser. No. 357,652
Claims priority, application Great Britain, Apr. 23, 1963,
16,002/63
4 Claims. (Cl. 92—13)

This invention relates to fluid pressure actuators and has for its object to provide a simple form of actuator in which rotary movement is imparted to an output shaft by the action of fluid pressure on a piston coupled to the said shaft.

According to the present invention a fluid pressure actuator for producing rotary motion comprises a casing having bearings supporting an output shaft, a pair of fluid pressure cylinders incorporated in said casing and arranged with their axes at right angles to the axis of rotation of the output shaft, a piston extending between said cylinders, coupling means extending between the output shaft and the piston arranged so that axial displacement of the piston in one direction or the other results in rotational movement of the output shaft said coupling means consisting of a pair of arms each of which is secured by one end to the output shaft the opposite end of each arm being connected to a trunnion carried by the piston and positioned intermediate the length thereof, the arms being slidably connected to the trunnion to permit the swinging movement of the arms during axial movement of the piston. Preferably a valve is associated with each cylinder said valves being simultaneously operable by fluid pressure supplied to the actuator for effecting piston movement, to permit said fluid to flow to one of the cylinders and open the other to drain. Advantageously the valves are incorporated in the casing thus providing a unitary structure. In addition the valve means can be arranged to provide a fluid lock in the cylinder so that the piston can be held against movement to lock the output shaft in any desired angular position.

An embodiment of the invention will now be described by way of example with the aid of the accompanying drawings in which:

FIGURE 3 is a top plan view of FIGURE 1.

Figure 1:
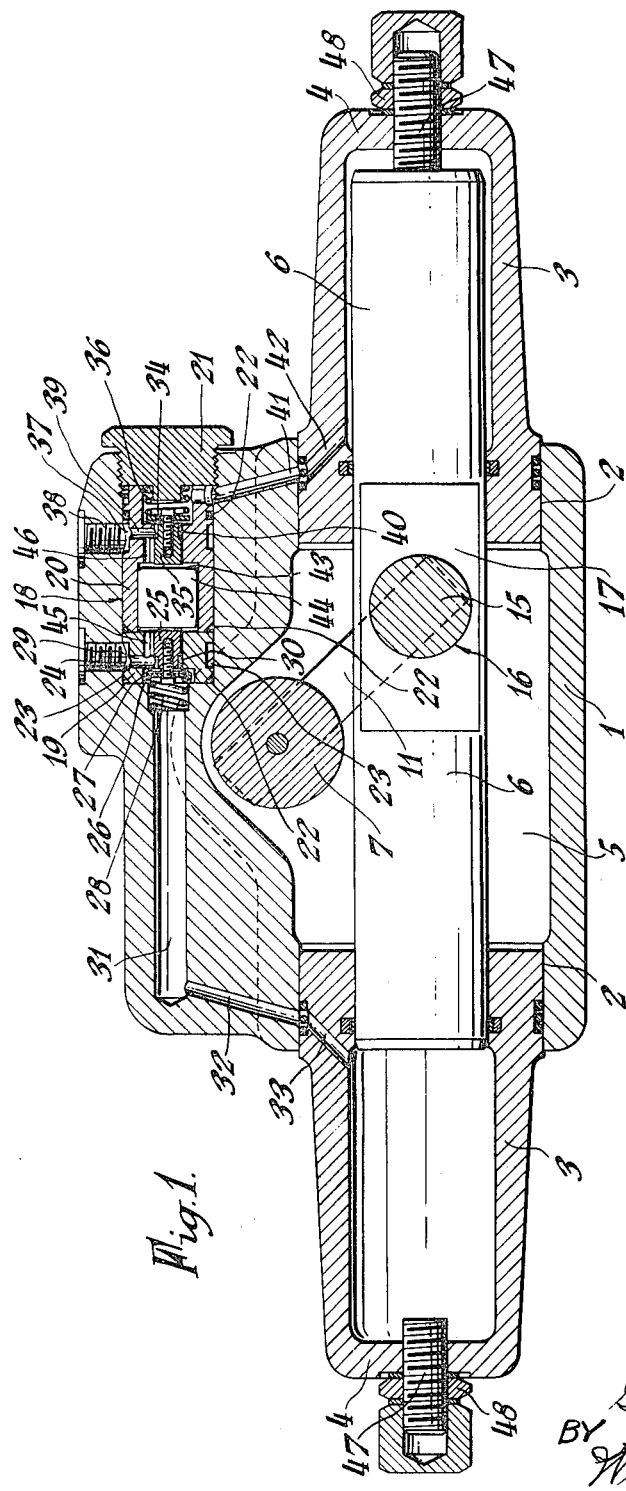
FIGURE 1 is a sectional view of the fluid pressure actuator.
Figure 2:
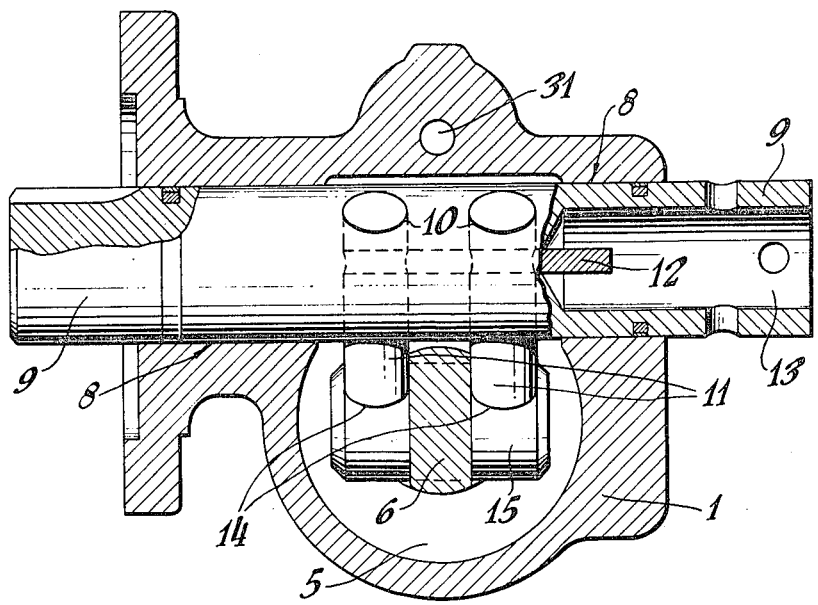
FIGURE 2 is a section on the line II—II in FIGURE 1.

Referring to the drawings, the actuator comprises a main casing 1 having a bore 2 at opposite ends thereof each bore being adapted to receive the inner open end of a fluid pressure cylinder 3 the outer end of each cylinder being closed by an end wall 4, each cylinder being secured in position in its bore by securing means not shown. The cylinders 3 are arranged in alignment with one another the inner ends being spaced apart, the gap between the cylinder ends providing a chamber 5 in the interior of the casing. A piston 6 extends across the gap, the axial length of the piston being such that the opposite ends thereof are disposed one in each cylinder 3. An output shaft 7 extends through the casing the axis of the shaft being arranged at right angles to the axis of the cylinders 3, symmetrically between the cylinders and offset to one side of the said axis of the cylinders. The output shaft is rotatably supported in plain bearing bores 8 in the casing 1 the opposite ends 9 of the output shaft extending outwardly of the casing. The output shaft is provided in its central region with a pair of axially spaced diametrically extending holes 10 each of which receives one end of an arm 11 the arms being secured by a locking pin 12 which is driven through an axially extending drilling in the output shaft the pin passing through a hole in each arm 11. One of the ends 9 of the output shaft is counterbored as shown at 13 to permit the assembly, of the locking pin 12. The radially outer end of each arm 11 is slidably engaged in one of a pair of diametrical holes 14 in a trunnion 15 which passes through a diametrical hole 16 in the piston 6 and positioned midway of the length thereof. As shown in FIGURE 2 the arms 11 are arranged on opposite sides of the piston which is machined to provide a slot 17 (FIGURE 1) on each side thereof in the region of the trunnion. The arrangement is such that upon the admission of pressure fluid to one cylinder or the other the piston is axially displaced thus imparting a swinging movement to the arms 11 with resulting rotational movement of the output shaft, the amount of such rotational movement being dependent upon the amount of axial movement of the piston.

The supply of pressure fluid to the cylinders 3 is controlled by control valves incorporated in the casing 1. As shown in FIGURE 1 the casing 1 is provided with a blind bore 18 which provides a housing for a control valve assembly. The valve assembly comprises two cylindrical valve blocks 19 and 20 respectively disposed end to end within the bore and secured axially therein by a closure plug 21 screwed into the open end of the blind bore 18. Sealing rings 22 are provided to prevent leakage of pressure fluid in the valve housing. The inner valve block 19 is provided on its periphery with an annular groove 23 which is in alignment with the inner end of a port 24 through the wall of the casing 1. A centrally disposed axial hole in the inner valve block 19 receives a slidable plunger 25 supporting a poppet valve 26 the head of which is disposed in a recess 27 in the inner end of the valve block 19 the valve stem being screwed into a tapping in the slidable plunger 25. The poppet valve is spring loaded by a compression spring 28 the spring action urging the valve head to a seated position against the end of the valve block 19. A radial drilling 29 in the valve block 19 connects the port 24 to an annular space 30 between the plunger 25 and the hole in the valve block, the poppet valve when seated closing the port 24 to a passage 31 in the casing which passage is connected by a further passage 32 also in the casing and a passage 33 through the wall of the left hand cylinder 3 (FIGURE 1). The valve block 20 is also provided with a poppet valve identical to the valve 26. This further poppet valve is shown at 34 and is supported by a plunger 35 slidably mounted in a centrally disposed axial hole in the valve block. The poppet valve 34 is spring loaded by a compression spring 36, the spring action urging the valve to a seated position against the adjacent end of the valve block 20. The poppet valves 26 and 34 are axially in alignment with one another. The periphery of the valve block 20 has an annular groove 37 in communication with the inner end of a further port 38 in the casing 1 a radial drilling 39 in the valve block 20 connecting the annular groove 37 to an annular space 40 around the plunger 35, the poppet valve 34 when in the seated position closing the further port 38 to a passage 41 in the casing 1 which passage communicates through a drilling 42 in the wall of the right hand cylinder 3 (FIGURE 1) with the interior of this cylinder.

The valve block 20 is also provided with a cylindrical recess 43 in which is disposed a floating piston 44 the inner ends of the plungers 25 and 35 projecting into the recess. Axial drillings 45 and 46 in the valve blocks 19 and 20 respectively connect the opposite ends of the cylindrical recess to the radial drillings 29 and 39.

In use, the ports 24 and 38 are connected to a main control valve (not shown) adapted for actuation by an operator, the valve being operable to connect simultaneously one of said ports to the pressure fluid supply and the other to drain whereby the piston 6 can be moved in one direction or the other to effect appropriate rotation of the output shaft. In FIGURE 1 the piston 6 is shown at the limit of its stroke to the right so that the output shaft 7 is at the limit of anti-clockwise rotation. If the main control valve is now operated to admit pressure fluid to the port 38 and the port 24 to drain, the poppet valve 34 will be unseated by the pressure fluid, the pressure fluid also acting on the floating piston 44 so that the same moves to the left (FIGURE 1) to unseat the poppet valve 26. The left hand cylinder 3 is thus opened to drain so that pressure fluid entering the right hand cylinder 3 can displace the piston 6 to the left to cause clockwise rotation of the output shaft 7, the main valve being again operated to a neutral position to interrupt the supply of fluid to the cylinder when the desired amount of rotation of the output shaft has been attained. When the main valve is in the neutral position both poppet valves will return to the closed position by their respective springs the piston 6 being held in the adjusted position by the fluid pressure lock established by the closing of the poppet valves.

In the construction shown in the drawings a threaded stud 47 is provided in the closed end wall 4 of each cylinder 3. The studs provide limit stops which can be adjusted to vary the limit position of the stroke of the piston 6, the studs being secured in the adjusted position by a lock nut 48. In addition each cylinder 3 is provided with a bleed valve 49 (FIGURE 3).

The rotary actuator according to the invention can be actuated either hydraulically or by gas pressure.

I claim:

1. A fluid pressure actuator for producing rotary motion comprising a housing, an elongated piston in said housing, a pair of spaced cylinders, the opposite ends of said piston extending into said cylinders, a rotatable shaft extending out said housing and disposed at a right angle with said piston, said piston having vertical slots disposed in its opposite sides centrally thereof, said piston having a horizontal bore extending therethrough adjacent said slotted sides, a cylindrical horizontal trunnion journalled in said piston bore at a right angle with the piston axis, a pair of parallel bores extending through said trunnion on opposite sides of said slotted sides, a pair of axially spaced diametrically extending parallel bores in said rotatable shaft, a pair of arms disposed in said shaft bores and said trunnion bores, a pin extending through said shaft and arms and locking them together, the end of said arms in said trunnion being slidably disposed therein.

2. The actuator of claim 1 wherein threaded adjustable stop means are provided in the end of each cylinder end disposed opposite the end of said piston extending therein.

3. The actuator of claim 1 wherein said cylindrical arms have a substantial portion of their peripheral surface in contact with a substantial portion of the surface of said parallel bores in said trunnion.

4. The actuator of claim 2 wherein said trunnion has a substantially axially extending portion of its circumference in contact with a substantial portion of the surface of said piston bore.

References Cited by the Examiner

UNITED STATES PATENTS

| 1,229,443 | 6/17 | Hall et al. | 92—138 |
| 2,648,346 | 8/53 | Deardorff et al. | 91—420 |
| 2,928,375 | 3/60 | Hermann | 92—138 |
| 3,104,592 | 9/63 | Sheesley | 92—13 |

FOREIGN PATENTS 655,042   7/51   Great Britain.

FRED E. ENGELTHALER, *Primary Examiner.*
SAMUEL LEVINE, *Examiner.*